United States Patent
Pitt

(10) Patent No.: US 7,424,989 B2
(45) Date of Patent: Sep. 16, 2008

(54) INTELLIGENT MULTIFUNCTIONAL ACTUATION SYSTEM FOR VIBRATION AND BUFFET SUPPRESSION

(75) Inventor: Dale M. Pitt, Affton, MO (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 10/798,687

(22) Filed: Mar. 11, 2004

(65) Prior Publication Data

US 2005/0224659 A1 Oct. 13, 2005

(51) Int. Cl.
*B64G 1/44* (2006.01)
(52) U.S. Cl. .............. 244/174; 244/99.13; 244/173.2; 248/636
(58) Field of Classification Search ............. 244/174, 244/99.13, 173.2; 248/638, 636
See application file for complete search history.

(56) References Cited

U.S. PATENT DOCUMENTS

| | | | | |
|---|---|---|---|---|
| 3,259,897 A * | 7/1966 | Strathman | ................ | 342/39 |
| 4,819,182 A * | 4/1989 | King et al. | ................ | 700/280 |
| 5,135,186 A * | 8/1992 | Ako | ................ | 244/78.1 |
| 5,435,729 A * | 7/1995 | Hildreth et al. | ................ | 434/365 |
| 5,549,260 A * | 8/1996 | Reed, III | ................ | 244/195 |
| 6,241,182 B1* | 6/2001 | Durandeau et al. | ................ | 244/99.4 |
| 6,322,324 B1* | 11/2001 | Kennedy et al. | ................ | 416/1 |
| 6,375,127 B1* | 4/2002 | Appa | ................ | 244/215 |
| 6,394,242 B1* | 5/2002 | Allaei | ................ | 188/378 |
| 6,607,161 B1* | 8/2003 | Krysinski et al. | ................ | 244/7 A |
| 6,609,985 B2* | 8/2003 | Todd et al. | ................ | 474/109 |
| 6,669,139 B2* | 12/2003 | Kubica | ................ | 244/76 R |
| 6,904,422 B2* | 6/2005 | Calise et al. | ................ | 706/23 |
| 2004/0104302 A1* | 6/2004 | Schierenbeck | ................ | 244/10 |

* cited by examiner

*Primary Examiner*—John W Eldred
(74) *Attorney, Agent, or Firm*—Harness, Dickey & Pierce, P.L.C.

(57) ABSTRACT

Circuits and methods for use on a mobile platform including a flight control system, a structure, an aerodynamic surface, and an actuator operatively coupled to the surface to control the surface. The circuit includes a first and a second input, a summing element, and an output. The first input accepts commands from the flight control system while the second input accepts a vibration signal from the structure. The summing element communicates with the inputs and sums the signal and the command. In turn, the summing element controls the actuator with the summed signal and command.

4 Claims, 4 Drawing Sheets

US 7,424,989 B2

INTELLIGENT MULTIFUNCTIONAL ACTUATION SYSTEM FOR VIBRATION AND BUFFET SUPPRESSION

FIELD OF THE INVENTION

This invention relates generally to flight control systems and, more particularly, to flight control systems for suppressing aerodynamically induced vibrations.

BACKGROUND OF THE INVENTION

High performance fighter aircraft such as the F-18 and F-22 (available from the Boeing Company of Chicago, Ill.) often experience high frequency aerodynamically induced vibrations of their wings, stabilators, and vertical tails. These vibrations are cause by buffeting aerodynamic forces and are transmitted into, and through, the aircraft structure. If uncompensated for, the associated stresses may lead to premature cracking of the structure. The resulting repairs of these cracks are both expensive and time consuming. In the alternative, aerodynamic modifications to reduce the causative turbulence impose performance constraints on the aircraft while structural modifications to reduce the resulting fatigue stress incur weight and cost penalties.

Additionally, the buffeting of the vehicle transmits noise into, and causes noise within, the aircraft structure. In turn, the structure transmits the noise to the cockpit wherein noise control measures, with additional penalties must be undertaken. Nor are these problems isolated to high performance aircraft. Automobiles, missiles, and launch and reentry vehicles (for example) also receive buffeting from aerodynamic forces.

Various attempts have been made to use the existing flight control actuators to compensate for these aero-vibrations. However, the flight control system typically commands the actuator at rates of about 30 cycles per second or less. Since the vibrations occur at frequencies significantly higher than the commands, such attempts have failed.

Moreover, attempts to modify the flight control system to react quickly enough to respond to the vibration are impractical for a variety of reasons. For instance, such modifications require an order of magnitude increase in the flight computer speed. Thus, these solutions necessitate an upgrade of the computer. Additionally, modifying the flight control laws to accommodate the additional functionality necessitate the recertification of the flight control system. These recertifications are expensive, time consuming, and (as such) highly undesirable.

Furthermore, as composite materials replace aluminum, and other conventional, structural members (e.g. on the Boeing 7E7 aircraft) vibration control may assume an increasing importance in the design, operation, and maintenance of aircraft. Thus a need exists to reduce or eliminate aerodynamically induced vibrations.

SUMMARY OF THE INVENTION

It is in view of the above problems that the present invention was developed. The invention provides apparatus and methods for reducing vibrations of mobile platform structures.

In one preferred embodiment, the invention provides a self-contained actuation device that reduces the aerodynamic buffet loads. Accordingly, construction and operation of mobile platforms (e.g. aircraft) in accordance with the principles of the present invention results in more cost efficient platforms that possess better performance and longer service lives.

Another preferred embodiment employs the existing flight control actuators to reduce the aero-buffeting without requiring modification of the flight control system. The present embodiment also includes a vibration sensor placed on an aircraft structure (e.g. a wing) to sense the aero-vibration. The sensor is connected to a controller that is coupled to the actuator. The controller inverts the vibration signal and adds it to the actuator command from the flight control system. Then the controller sends the combined signal (the command with the inverted vibration signal superimposed thereon) to the actuator, thereby driving the actuator out of phase with the vibration. By thus canceling the vibration the current embodiment reduces cyclical loads and improves the fatigue life of the structure.

In yet another preferred embodiment, a method of reducing aerodynamically induced vibrations is provided. The method includes sensing the vibration and inverting a signal representative of the same. The inverted vibration signal is superimposed on a flight control system command for an actuator to drive the actuator out of phase with the vibration.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
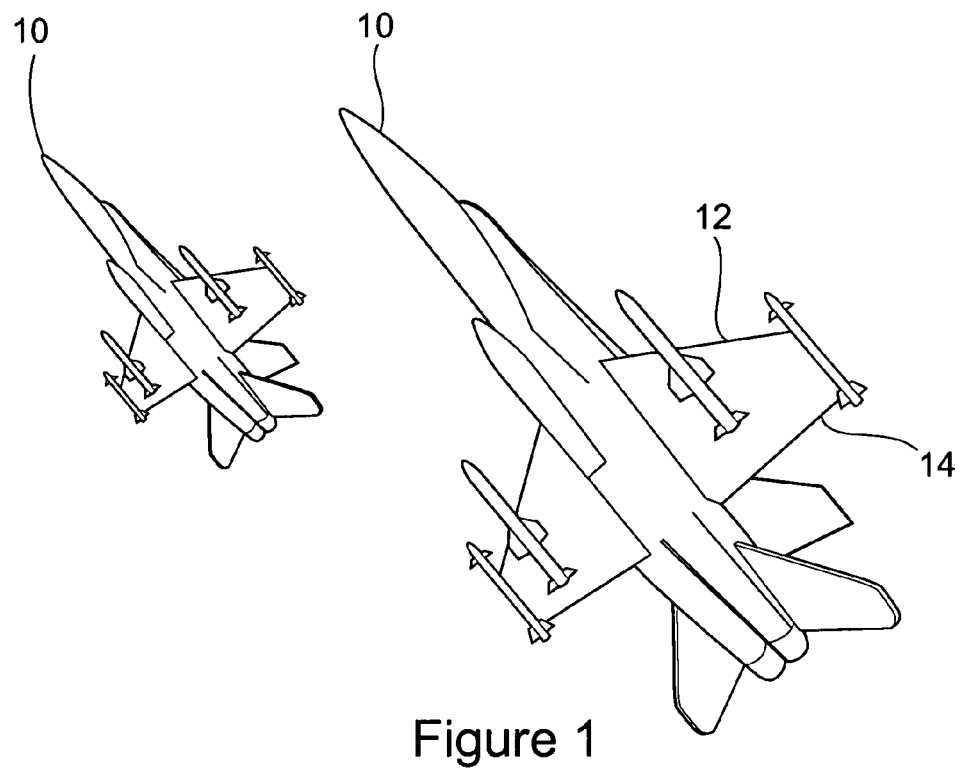
FIG. 1 illustrates an aircraft constructed in accordance with the principles of the present invention.
Figure 2:
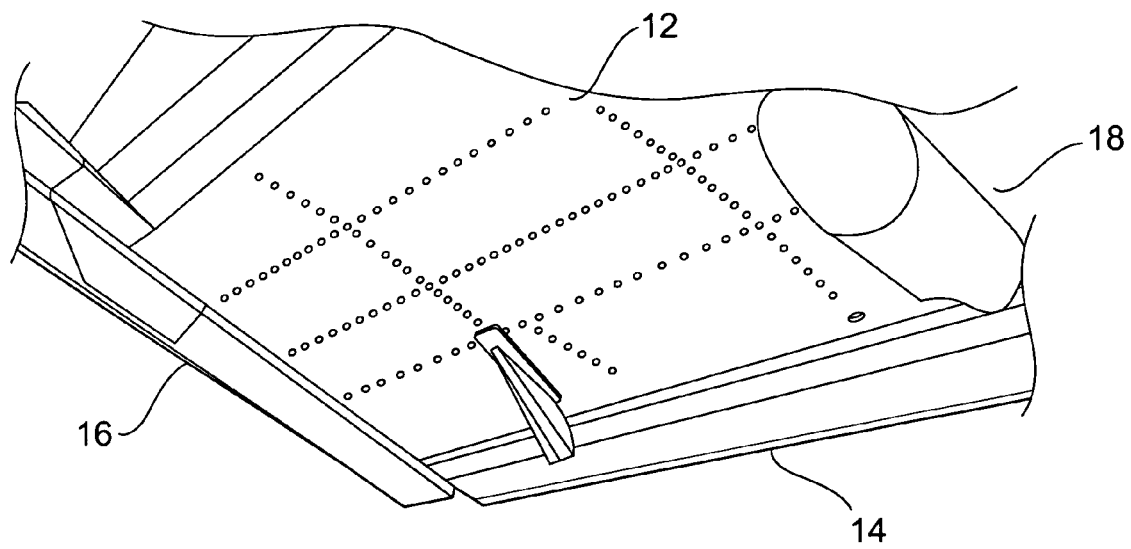
FIG. 2 is a detailed view of a wing of the aircraft of FIG. 1.

Referring to the accompanying drawings in which like reference numbers indicate like elements, FIG. 1 illustrates a pair of aircraft 10 constructed in accordance with a preferred embodiment of the present invention. The aircraft 10 includes a number of structures and control surfaces that are well known in the art and will herein be represented by an exemplary wing 12 and an aileron 14. Additionally, a fairing 18 that covers an aileron actuator may be seen on the underside of the wing 12.

During flight, the flight computer and the pilot continually sense the flight related conditions (pitch, climb rate, speed, and the like). Depending on the conditions, either the computer, the pilot, or both issue commands (e.g. electromagnetic signals) to reposition the ailerons 14 and other control surfaces. These commands cause the actuator 20 to either extend or retract to move the aileron 14. As noted previously, the wing 12 rushing through the air causes turbulence in the air that causes the wing 12 to vibrate. Additionally, the movement of the control surface 14 tends to change the airflow, thus introducing another source of turbulence, buffeting, and vibration.

Figure 3:
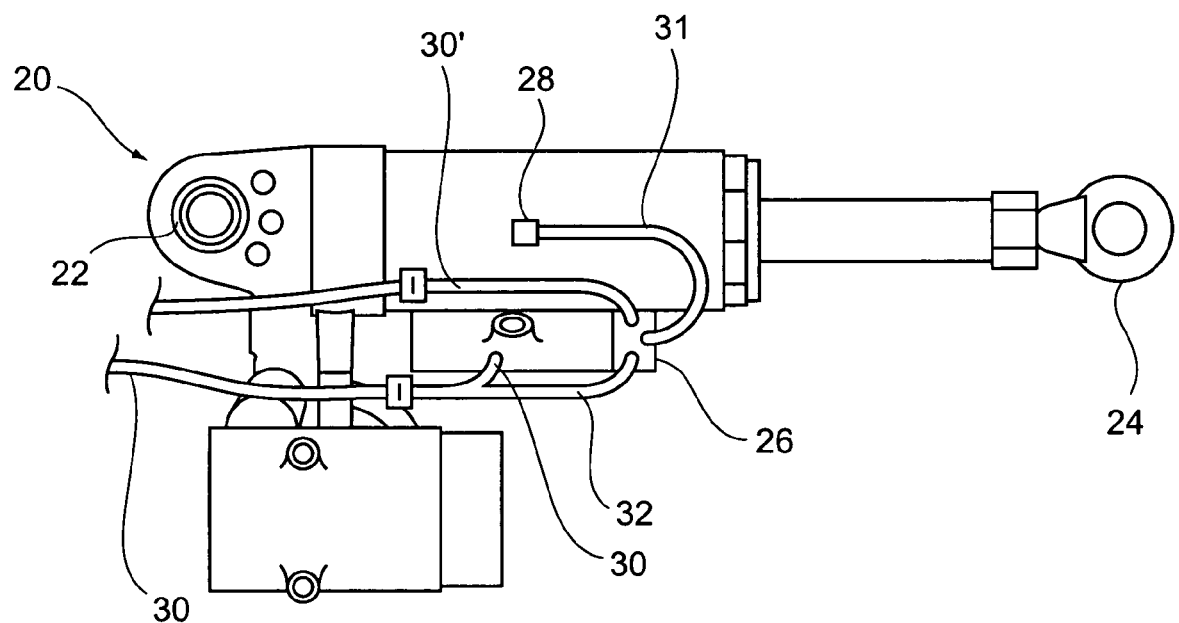
FIG. 3 shows an actuator in accordance with the principles of a preferred embodiment of the present invention.

Referring now to FIG. 3, an actuator 20 for the aileron 14 is shown. The actuator 20 includes an attachment fitting 22 for coupling the actuator 20 to the wing 12 and a ram 24 that moves in response to flight control system commands. The ram 24 is operatively coupled to the aileron 14 to change the aileron position. Additionally, FIG. 3 shows a circuit 26 being mechanically coupled to the actuator 20 as well as a vibration sensor 28 rigidly coupled to the actuator 20. While FIG. 3 shows the vibration sensor 28 separate from the circuit 26, the sensor 28 may be included in the circuit 26. It should also be noted that the actuator 20 may also include an internal position sensor such as an LVDT (linear variable differential transformer) to detect the position of the ram 24.

Additionally, the actuator typically includes a conventional power cable 30 for receiving power from the aircraft 10 power subsystem. A second power cable 32, in accordance with the principles of the present invention, branches from the first power cable 30 to supply the circuit 26 power. Importantly, branching cable 32 from cable 30 saves cable weight by obviating the need for a dedicated cable run from the aircraft 10 power subsystem to power the circuit 26. Another cable 30' carries the flight control system command to the circuit 26, while in previous systems the cable 30' was connected directly to the actuator instead of the circuit.

Moreover, coupling the vibration sensor 28 to the actuator 20 instead of the wing 12 (FIG. 1) eliminates the need for, and associated weight of, a vibration signal cable from the wing to the circuit 26. Though, the vibration sensor 28 may be located on the wing 12 without departing from the spirit or scope of the invention. Additionally, the elimination of the wing-to-circuit vibration signal cable simplifies the interfaces with the wing since a cable 31 on the actuator suffices to carry the vibration signal to the circuit. In turn, the simplification reduces airframe integration costs. Similarly, integrating the vibration sensor 28 with the circuit 26, rather than mounting the two on the actuator 26 separately, simplifies construction and installation of the actuator and reduces costs further still.

Furthermore, coupling the circuit 26 to the actuator 20 eliminates the need for cables between the circuit and the actuator to carry the command signal from the circuit and to carry the position signal from the actuator. Likewise, because the flight control system already includes a cable 30' to the actuator (to carry the actuator command) the present invention requires no modifications to the flight control system. Accordingly, the present invention further reduces integration costs and delays.

Figure 4:
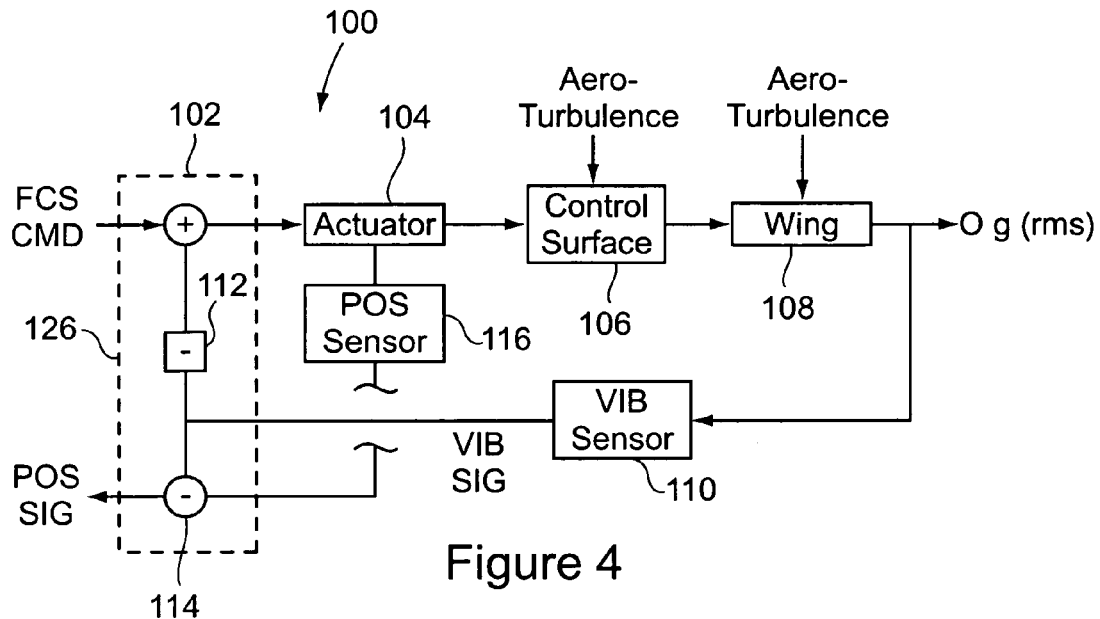
FIG. 4 is a block diagram of a control system in accordance with the principles of another preferred embodiment of the present invention.

With reference now to FIG. 4, the block diagram shown therein represents a system in accordance with an exemplary embodiment of the present invention. The system 100 includes a summing element 102, an actuator, 104, a control surface 106, a structure 108 (e.g. a wing), a vibration sensor 110, an invertor 112, a filter 114, and an actuator position sensor 116. Upon arrival from the flight control system a command passes through the summing element 102 (assuming for the moment there is no current vibration). The command causes the actuator 104 to move and reposition the control surface 106. Because of aerodynamic turbulence over the control surface 106 and wing 108, the wing begins to vibrate. In turn, the vibration sensor 110 generates a signal representative of the vibration that the inverter 112 inverts.

To complete the feedback loop, the summing element 102 superimposes the inverted vibration signal on the command. The resulting signal (the command with the inverted vibration signal superimposed on it) is fed to the actuator 104 to drive the control surface out of phase with the vibration. Accordingly, the control surface 106 causes a disturbance that cancels the vibration of the wing 108. Those skilled in the art will recognize that the commands typically operate up to approximately 30 Hz while the vibration occurs at substantially higher frequencies. Similarly, the commands are typically signals having amplitudes well in excess of the amplitude of the vibration signal (or can be so tailored with appropriate choice of system gains). Thus the inverted vibration signal appears as a ripple superimposed upon the command signal after the two are added.

Since many flight control systems are designed to sense the actual position of the actuator 104, a feedback signal may also be provided by the present invention. In particular the vibration sensor 110 and the position sensor 116 (of the actuator 104) may communicate with the filter 114 that subtracts the vibration signal from the position signal as sensed by the position sensor. Accordingly, the position signal fed back to the flight control system does not reflect the slight difference between the commanded position and the actual position as influenced by the vibration canceling circuit 126. Thus, by filtering the vibration signal from the actuator position signal, the present invention ensures that the flight control system operates properly (e.g. does not raise a false alarm to indicate that the actuator is out of position).

Note should also be made that FIG. 4 depicts a circuit 126. The circuit 126 includes the summing element 102, the inverter 112, and perhaps the filter 114 connected as shown. Hence, the circuit 126 combines the command and the inverted vibration signal to cancel the vibration. The circuit may also provide the filtered position signal as shown in FIG. 4. In one preferred embodiment, the control surface 106 is an aileron and the vibration sensor is placed as close to the wing tip as is practical. In this manner, the flexibility of the wing and the position of the sensor 110, well out on the wing ensure that a robust vibration signal is generated.

Figure 5:
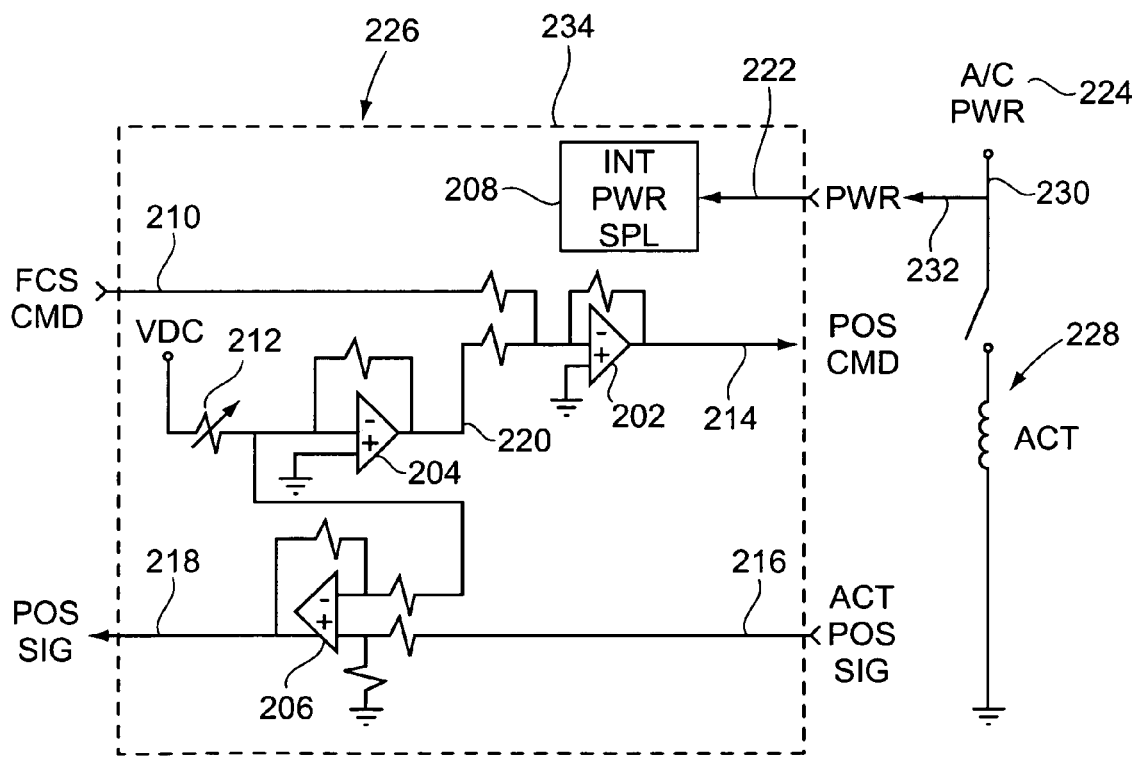
FIG. 5 is a schematic diagram of a circuit in accordance with a preferred embodiment of the present invention.

Now with reference to FIG. 5, a simplified schematic of a circuit 226 in accordance with a preferred embodiment of the present invention is illustrated. The circuit 226 includes a summing amplifier 202, an inverting amplifier 204, a difference amplifier 206, and an internal power supply 208. Interfaces with the circuit 226 include a flight control system command input 210, a vibration signal input (here, the vibration sensor 212 is shown as being internal so that the interface is not necessary), a command output 214, an actuator position signal input 216, and a position signal output 218. Internally, an inverted vibration signal 220 is also shown.

Additionally, a flight control actuator 228 is shown external to the circuit 226. Schematically FIG. 5 illustrates the actuator 228 as a solenoid to indicate that the actuator contains components that require electric power. The required electric power is typically supplied by the aircraft power subsystem 224 via a cable 230. A second power cable 232 is shown branching from the cable 230 and providing power to the power input 222 for the circuit 226. Thus, the circuit 226 and actuator share a common power supply. Those skilled in the art will recognize that the internal power supply 208 is shown in simplified form for clarity. Details such as neutral returns and interconnections to the amplifiers 202 to 206 have been likewise omitted.

Additionally, a housing 234 of the circuit 226 is rigidly coupled to the actuator so that the vibration transducer 212 accurately senses the vibration of the actuator. In turn, the actuator is rigidly mounted to the structure for which vibration reduction is desired (e.g. by the attachment means 22 shown by FIG. 3). Because of the rigid coupling between the structure and the actuator, and between the actuator and the sensor 212, the sensor 212 provides a reliable indication of the vibration of the structure.

Thus, in operation, the summing amplifier 202 sums the flight control command 210 and the vibration signal 220 as inverted by the inverting amplifier 204. The summing amplifier 202 outputs the command 214, with the inverted vibration signal superimposed thereon, to the actuator. As noted previously, the actuator causes an aerodynamic disturbance that cancels the vibration of the structure. Subsequently, if another transient disturbance causes the vibration to return, the vibration cancellation loop (as just described) acts to cancel the new vibration. In the alternative, a non-inverted vibration signal could be subtracted from the command to the same general effect of canceling the vibration.

The circuit 226 also includes a position feedback subsystem that includes the difference amplifier 206. The amplifier 206 accepts the position signal 216 from the actuator position sensor and subtracts the signal from the vibration signal supplied by the sensor 212 therefrom. Accordingly, the amplifier 206 filters the vibration signal from the position signal 216 and communicates the result 218 to the flight control system.

Figure 6:
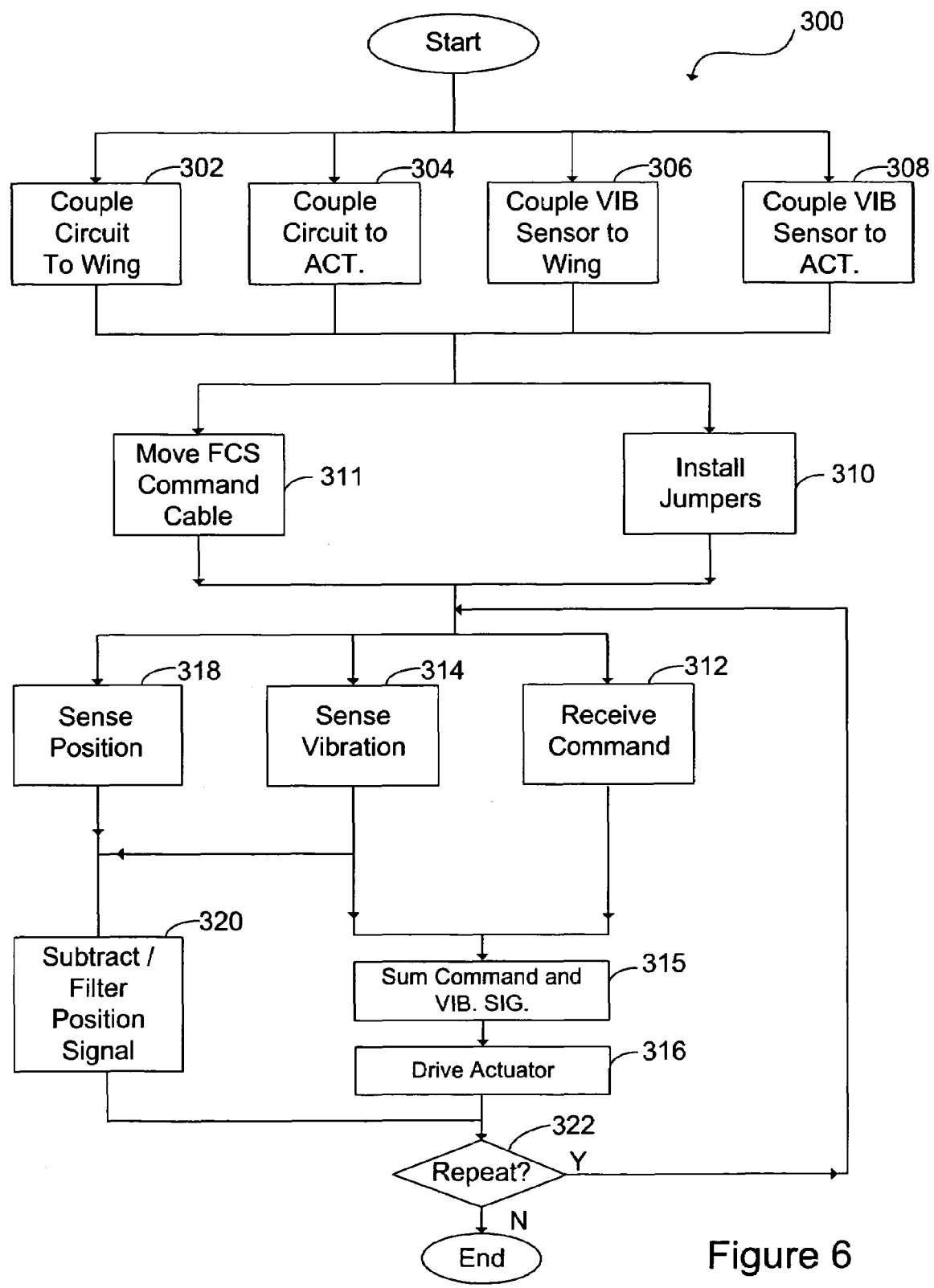
FIG. 6 is a flowchart of a method in accordance with a preferred form of the present invention.

With reference now to FIG. 6, a flowchart illustrating a method in accordance with the principals of the present invention is shown. The method includes mounting a vibration canceling circuit to either the wing or the aileron actuator as shown at 302 and 304 respectively. In operations 306 and 308 a vibration sensor is coupled to either the wing or the actuator. Jumpers are then installed between the circuit and the vibration sensor, the circuit and a position sensor of the actuator, and the circuit and the actuator power supply (preferably within the envelope of the actuator). See operation 310. Moreover, the flight control system cable that carries the actuator command is moved from the actuator to the circuit in operation 311.

With the power on, commands for the actuator may then be received while the vibration is sensed as at 312 and 314. The two signals are added, subtracted, or superimposed to obtain a command with an inverted vibration signal superimposed upon it at operation 315. The combined signal, from operation 315, is used to drive the actuator out of phase with the vibration. See operation 316. Meanwhile, the position of the actuator may be sensed in 318. Accordingly, the vibration signal may be filtered from the position feedback signal and the result forwarded the flight control system. See for instance operation 320. In this manner, the method may repeat for as long as vibration canceling is desired as indicated at decision 322.

In view of the foregoing, it will be seen that the several advantages of the invention are achieved and attained. Notably, the embodiments described herein require no added cabling, or cabling modifications outside of the envelope of the actuator. Moreover, the present invention requires no modification to the flight control system, or even the flight computer. Thus, the present invention provides vibration elimination with a weight and cost savings over previous attempts to reduce aerodynamically induced vibrations.

The embodiments were chosen and described in order to best explain the principles of the invention and its practical application to thereby enable others skilled in the art to best utilize the invention in various embodiments and with various modifications as are suited to the particular use contemplated. For example, many industrial machines include structures that are moved by an actuator commanded by a control system. If the machine includes a tool (e.g. a drill) on the movable structure, the tool may induce undesired vibrations in the structure. Thus, the apparatus and methods discussed herein may be adapted to sense the tool induced vibration of the structure and cancel the same without requiring modification of the machine control system. Accordingly, machines with increased precision and accuracy are also provided by the present invention.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of damping vibrations of a wing of an aircraft, the aircraft including a control system, a movable structure operatively connected to the wing, and an actuator operatively coupled to the structure to move the structure in response to a command signal generated by the control system, the method comprising:

processing a vibration signal representative of a vibration of the wing to obtain a vibration canceling signal, the processing performed independent of the control system in a vibration canceling circuit mechanically mounted on the actuator, the vibration canceling circuit including a vibration sensor that provides the vibration signal;

providing the command signal from the control system to the vibration canceling circuit;

in the vibration canceling circuit, superimposing the vibration canceling signal on the provided command signal to generate a resultant driver signal;

operating the actuator with the resultant driver signal to cycle the structure to reduce the vibration of the wing;

filtering, in the canceling circuit, the vibration signal from a position signal representative of a position of the actuator; and inputting the filtered position signal from the canceling circuit to the control system.

2. A method of damping vibrations of a wing of an aircraft, the aircraft including a control system, a movable structure operatively connected to the wing, and an actuator operatively coupled to the structure to move the structure in response to a command signal generated by the control system, the method comprising:

mechanically mounting a housing of a vibration canceling circuit on the actuator and electrically interposing the canceling circuit between the actuator and the control system;

rigidly coupling a vibration sensor to the actuator to provide a vibration signal in the canceling circuit representative of a vibration of the wing;

configuring the canceling circuit to use the provided vibration signal to produce a vibration canceling signal and to superimpose the vibration canceling signal as a ripple on the command signal from the control system to generate a resultant driver signal;

and operating the actuator using the resultant driver signal;

the method further comprising configuring the vibration canceling circuit to filter the vibration signal from a position signal representative of a position of the actuator and to input the filtered position signal to the control system.

3. A method of damping vibrations of a wing of an aircraft, the aircraft including a control system, a movable structure operatively connected to the wing, and an actuator operatively coupled to the structure to move the structure in response to a command signal generated by the control system, the method comprising:
- receiving from a vibration sensor a vibration signal representative of a vibration of the wing;
- inverting the vibration signal and superimposing the inverted signal as a ripple on the command signal to obtain a driver signal, the ripple having a freguency higher than the operating freguency of the command signal; and
- providing the driver signal to the actuator;
- said method performed by a vibration canceling circuit mechanically mounted on the actuator and electrically interposed between the actuator and the control system;

the method further comprising:
- filtering the vibration signal from a position signal representative of a position of the actuator; and
- inputting the filtered position signal to the control system;
- said filtering and inputting performed by the vibration canceling circuit.

4. The method of claim 3, wherein the filtering is performed using a difference amplifier of the vibration canceling circuit.

* * * * *